US008915412B2

(12) United States Patent
Abro et al.

(10) Patent No.: US 8,915,412 B2
(45) Date of Patent: Dec. 23, 2014

(54) CUP HOLDER ASSEMBLY

(75) Inventors: Lauren M. Abro, Farmington Hills, MI (US); Benjamin Warren Penner, Aiken, SC (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 226 days.

(21) Appl. No.: 13/432,898

(22) Filed: Mar. 28, 2012

(65) Prior Publication Data
US 2013/0256356 A1 Oct. 3, 2013

(51) Int. Cl.
*B60N 3/10* (2006.01)

(52) U.S. Cl.
USPC ................... 224/544; 224/926; 297/188.14

(58) Field of Classification Search
CPC ......... B60N 3/101; B60N 2/4686; A47C 7/68
USPC ............... 224/544, 539, 926, 275, 543, 547, 224/564–566, 571; 248/311.52, 311.2; 297/188.14, 188.15, 188.17–188.19
See application file for complete search history.

(56) References Cited

U.S. PATENT DOCUMENTS

| 5,150,946 | A |   | 9/1992 | Marfilius et al. |
| 5,297,767 | A | * | 3/1994 | Miller et al. ................ 248/311.2 |
| 5,509,633 | A |   | 4/1996 | Ruster et al. |
| 5,527,091 | A | * | 6/1996 | Gruber .................... 297/188.01 |
| 5,660,433 | A | * | 8/1997 | Bruhnke et al. ......... 297/188.17 |
| 5,803,421 | A |   | 9/1998 | Kerner et al. |
| 5,816,663 | A | * | 10/1998 | Steinle .......................... 297/488 |
| 6,170,787 | B1 |   | 1/2001 | Morgan |
| 7,322,500 | B2 | * | 1/2008 | Maierholzner ............... 224/486 |
| 7,334,838 | B2 | * | 2/2008 | Pope ........................ 297/188.14 |
| 7,488,675 | B2 | * | 2/2009 | Lin ............................... 438/614 |
| 7,585,021 | B2 |   | 9/2009 | Tabata |
| 8,231,173 | B2 | * | 7/2012 | Miyazaki et al. ......... 297/188.14 |
| 8,505,997 | B2 | * | 8/2013 | Hipshier et al. ............. 296/37.8 |
| 2007/0267910 | A1 | * | 11/2007 | Bergin ..................... 297/411.26 |
| 2009/0108652 | A1 | * | 4/2009 | Tabata .......................... 297/228 |
| 2010/0244507 | A1 | * | 9/2010 | Miyazaki et al. ......... 297/188.14 |

FOREIGN PATENT DOCUMENTS

| DE | 20321817 U1 | 11/2010 |
| DE | 10112649 B4 | 2/2011 |
| GB | 2402116 A | 12/2004 |
| JP | 11342779 A | 12/1999 |
| JP | 2002193019 A | 7/2002 |
| JP | 2003072447 A | 3/2003 |
| JP | 2009106670 A | 5/2009 |
| JP | 4807911 B9 | 8/2011 |

* cited by examiner

*Primary Examiner* — Brian D Nash
*Assistant Examiner* — Corey Skurdal
(74) *Attorney, Agent, or Firm* — Gifford, Krass, Sprinkle, Anderson & Citkowski, P.C.

(57) ABSTRACT

A cup holder assembly for use in an automotive vehicle is provided. The cup holder assembly includes a panel and cup holder. The panel includes a top surface. The top surface includes at least one beverage container opening configured to receive a cup holder. A pocket is formed on the top surface of the panel and a cushion is disposed within the pocket. The panel may be covered with a skin such as a synthetic leather so as to cover the panel.

7 Claims, 3 Drawing Sheets

CUP HOLDER ASSEMBLY

FIELD OF THE INVENTION

The invention relates to a cup holder assembly for use in an automotive vehicle. More particularly the invention relates to a cup holder assembly having a cushion disposed in a pocket formed on a top surface of a panel.

BACKGROUND OF THE INVENTION

Cup holder assemblies for use in an automotive vehicle are currently known and used. Such cup holder assemblies are commonly found on a center console of the vehicle disposed between the front passenger and driver seat, Accordingly such cup holders are positioned in a space convenient for a passenger or driver to rest an arm upon. Currently cup holder assemblies have a rigid planar surface operable to provide a smooth aesthetic look. However, a rigid surface may provide certain discomfort to the user. Accordingly it remains desirable to have a cup holder assembly having a cushioned surface wherein the outer surface or exposed surface of the cup holder assembly maintains a smooth and uniform exterior appearance.

SUMMARY OF THE INVENTION

According to one aspect of the invention a cup holder assembly for use in an automotive vehicle is provided. The cup holder assembly includes a panel and cup holder. The panel includes a top surface. The top surface includes at least one beverage container opening configured to receive a cup holder. A pocket is formed on the top surface of the panel and a cushion is disposed within the pocket. The panel may be covered with a skin such as a synthetic leather so as to cover the panel.

The cushion may be formed from a closed pore foam and placed within the pocket through an injection molding process. Alternatively, the cushion may be cut from a block of foam cushion in complementary shapes of the pockets. The top surface of the cushion lies along a plane which is shared with the plane of the panel.

The cup holder may be formed as a separate piece and attached to the undersurface of the panel. The cup holder includes a side wall and a pair of containers adapted to hold a beverage container. Each of the pair of containers is disposed on opposite ends of the side wall and is respectively registered to fit beneath respective beverage container openings of the panel so as to accommodate a beverage container in the center console of an automotive vehicle.

The containers may further include a lip extending radially and outwardly from the container opening. The lip may form a surface for mounting the cup holder to the underside of the panel.

The panel may be formed to fit onto a center console. Specifically the panel may include a peripheral wall. The peripheral wall extends downwardly from an outer edge of the panel. The peripheral wall forms mounting surfaces for attachment to a center console. Various attachment methods currently known and used in art may be adapted and used herein illustratively including mechanical attachments such as screws or a physical attachment such as vibrational welding.

The skin may be mounted over the peripheral wall and tightened so as to form a smooth exterior surface. The skin covers the top surface of the panel and the cushions to as to present a generally planar surface. The skin may be fastened to the panel using known fastening techniques such as adhesive glue, vibrational welding and the like.

The pockets may be formed through an injection molding process. The pockets may be selectively disposed along portions of the panel where a user is likely to rest his arm. The pockets have a support surface which is displaced downwardly relative to the top surface of the panel. The support surface forms depressions and may include angled walls sloping downwardly with respect to an outer edge of the panel.

The panel may include a plurality of pockets. The cup holder assembly may include a plurality of beverage container openings. The beverage container openings may be generally centered on an axis bisecting the length of the panel. The beverage container openings are spaced apart from each other so as to be formed on opposite ends of the panel. For example, one pocket may be formed between a front side edge of the panel and the first beverage container opening and another pocket may be formed between the first and second beverage container openings. Yet a third pocket may be formed between the second beverage container opening and the second side edge of the panel.

As stated above, a cushion pad may be mounted within the pockets or closed pore foam may be injected into the pockets. The top layer of the cushion is configured to form a uniform surface lying on a plane shared by the top surface of the panel so as to present a smooth and uniform exposed surface of the panel.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

Figure 1:
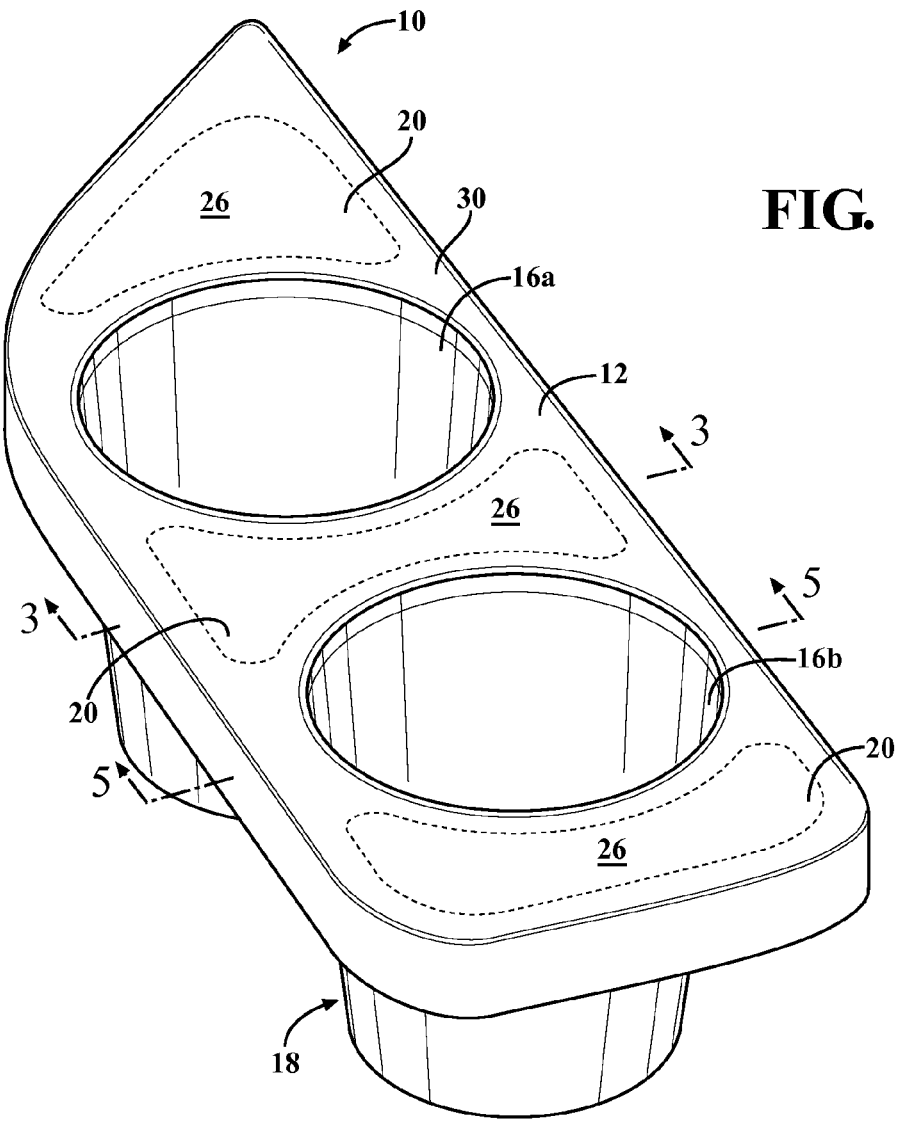
FIG. 1 is a perspective view of the cup holder assembly.
Figure 3:
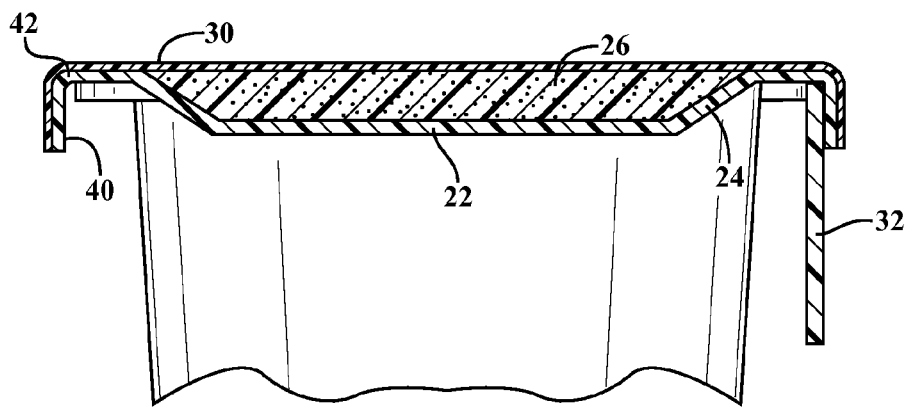
FIG. 3 is a cross section of FIG. 1 taken along lines 3-3.

With reference now to FIGS. 1-5, an illustrative embodiment of the cup holder assembly 10 for use in an automotive vehicle is provided. The cup holder assembly 10 may be mounted to a center console of a vehicle. The cup holder assembly 10 includes a panel 12. The panel 12 may be formed through an injection molding process using materials such as polymers so as to form a rigid plastic body.

The panel 12 includes a top surface 14. The top surface 14 is generally planar and when mounted onto the center console forms a surface which may be used to support the arm of a user. The panel 12 includes at least one beverage container opening 16 for receiving a cup holder 18.

The panel 12 further includes a pocket 20 formed on the top surface 14 of the panel 12. The pocket 20 is generally a depression having a support surface 22. The support surface 22 lies along a plane which is below the plane of the top surface 14, relative to a vehicle floor. Though the pocket 20 is shown formed with angled walls 24 it should be appreciated that the walls 24 may be relatively perpendicular or obtuse with respect to the top surface 14 of the panel 12.

The cup holder assembly 10 further includes a cushion 26. The cushion 26 is configured to fit within the pocket 20. The cushion 26 may be injection molded into the pocket 20 using closed pore foam. Alternatively the cushion 26 may be cut from a pad of foam and fitted into the pocket 20. The cushion 26 has an upper surface 28 which is exposed to the environment when not covered by the skin 30. The upper surface 28 is generally planar and lies along the same plane as the top surface 14 of the panel 12. Thus the cushion 26 and the panel 12 have an exposed surface disposed along the same plane.

The cup holder 18 may include a plurality of beverage container openings 16 for receiving beverage containers. As shown in the figures, the cup holder 18 has two beverage container openings 16. However, it should be appreciated by those skilled in the art that a cup holder 18 with two beverage container openings 16 is provided for illustrative purposes and is in no way meant to be limiting. The second beverage container opening 16b is spaced apart the first beverage container opening 16a.

The cup holder assembly 10 may include a cup holder 18 formed from a separate piece. The cup holder 18 includes a side wall 32 and a pair of containers 34. The containers 34 are adapted to hold a beverage container. The containers 34 are disposed on opposite ends of the side wall 32 and each container 34 is registered to fit beneath the beverage container openings 16 of the panel 12 so as to support a beverage container.

Figure 5:
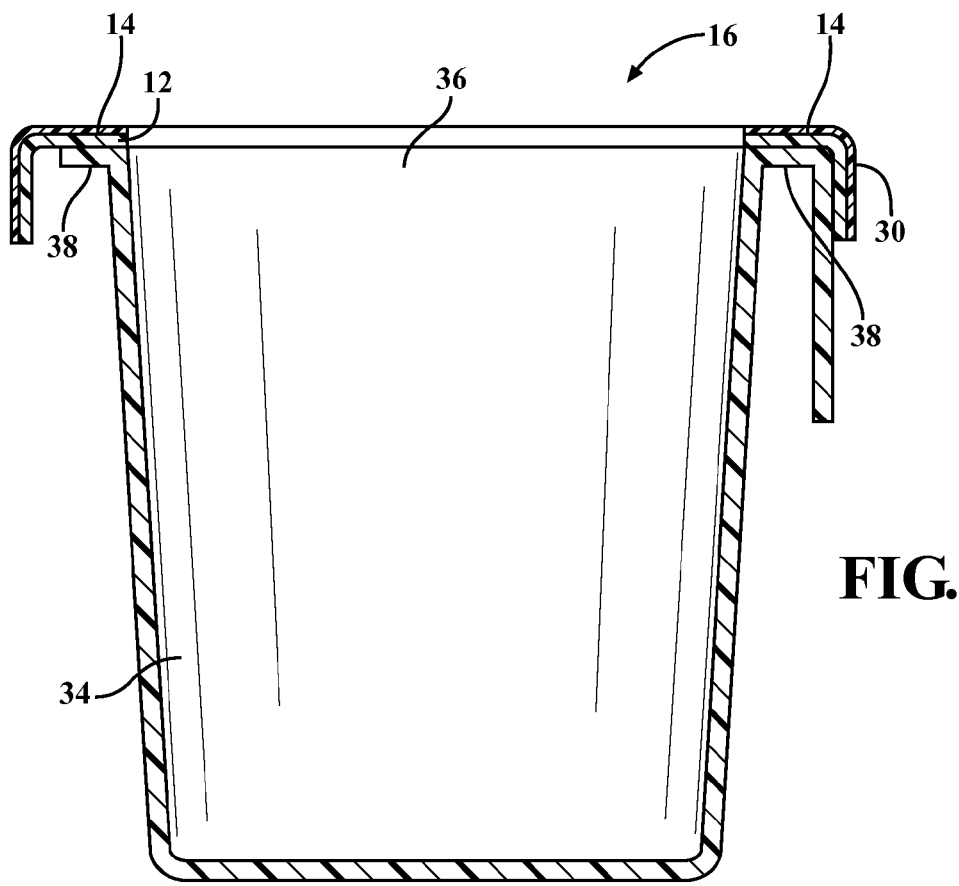
FIG. 5 is a cross-sectional view of FIG. 1 taken along lines 5-5.

The cup holder 18 may be formed of a durable and rigid material through injection molding or a clamshell molding process. The containers 34 include a container opening 36 and a lip 38 extending radially and outwardly from the container opening 36. The lip 38 forms a surface operable to facilitate the mounting of the pair of containers 34 to an underside of the panel 12 as shown in FIG. 5. Specifically the lip 38 may be attached to the underside of the panel 12. Further the side walls 32 may be attached to the panel 12 as well.

The cup holder assembly 10 may be configured to mount onto the center console of an automotive vehicle between the driver and front passenger seats. The cup holder assembly 10 may further include a peripheral wall 40 extending downwardly along an outer edge 42 of the panel 12 so as to bound the edges of the panel 12. The peripheral wall 40 forms surfaces operable to facilitate the attachment of the cup holder assembly 10 to a console assembly of a vehicle.

The skin 30 may be mounted over the panel 12 and attached to a portion of the peripheral wall 40. Preferably the skin 30 is pulled taut over the top surface 14 and attached along the edges of the panel 12 as well as to a portion of the peripheral wall 40. The skin 30 may be formed from leather or some other pliable synthetic material.

Figure 2:
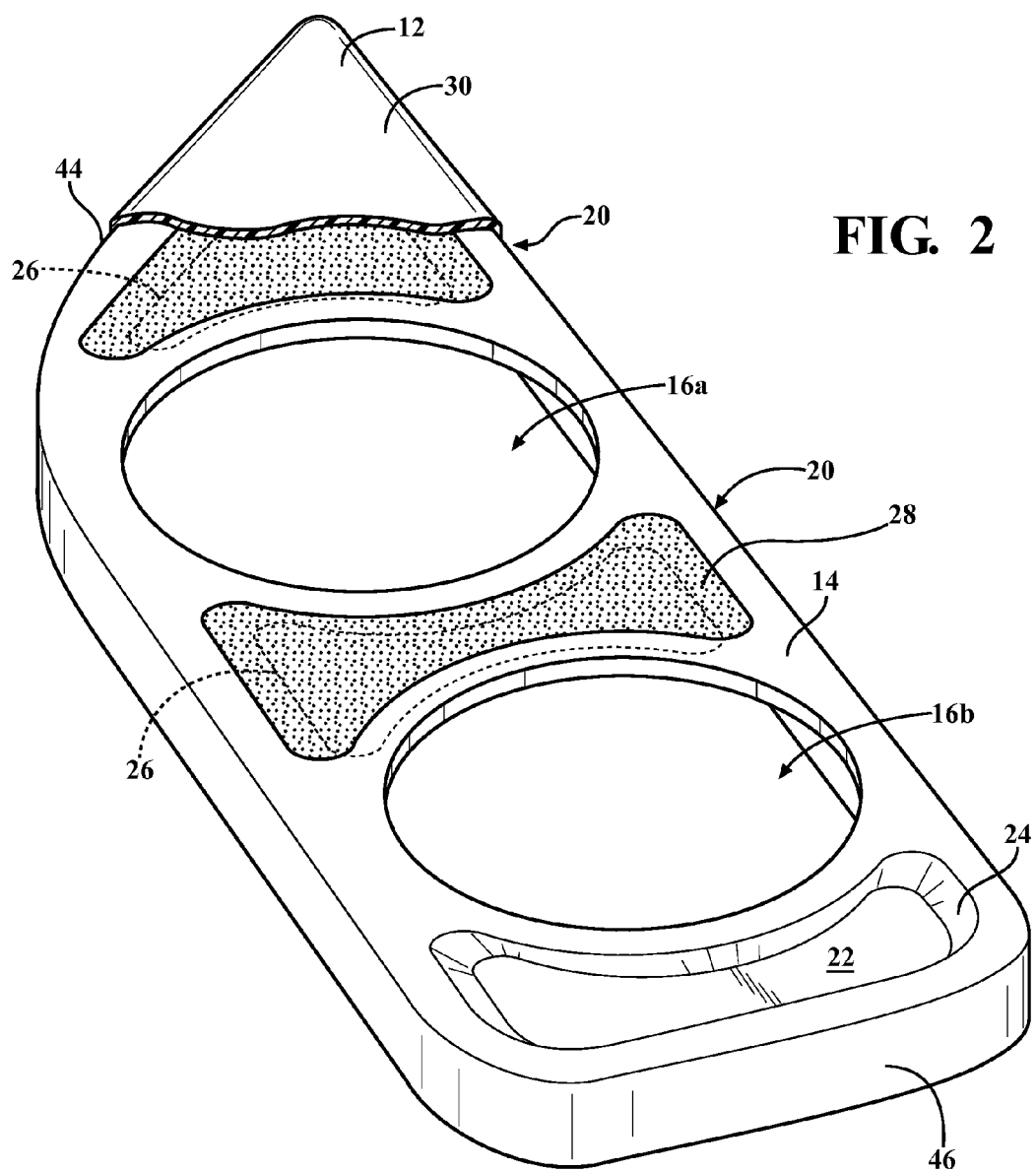
FIG. 2 is a isolated view of the panel.
Figure 4:
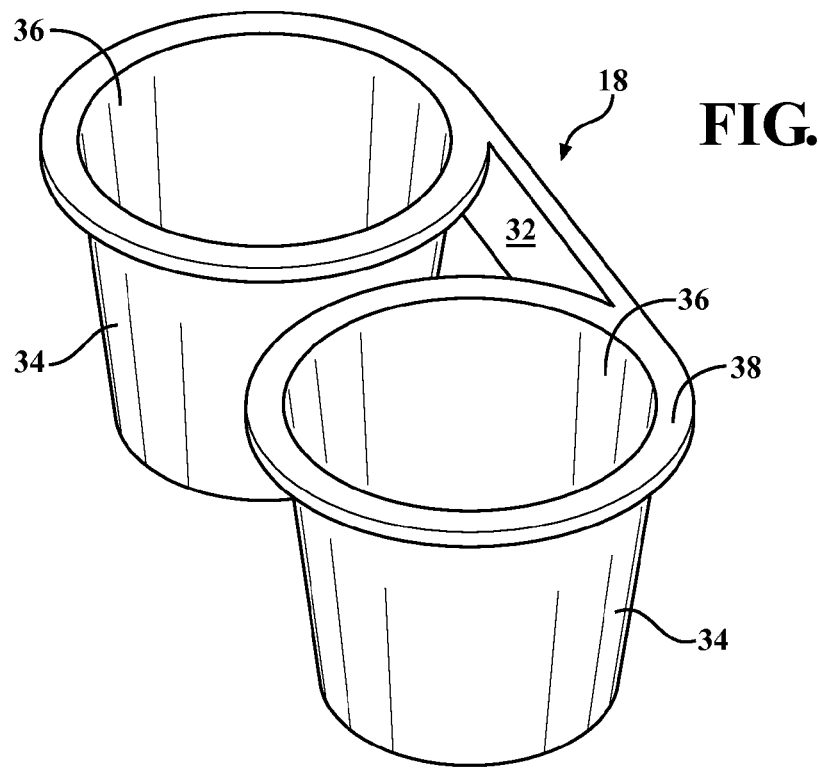
FIG. 4 is an isolated view of the cup holder.

As shown in FIG. 2, the panel 12 is formed with a multitude of pockets 20. The pockets 20 are formed to the top surface 14 of the panel 12 so as to provide space for which a cushion 26 may be applied and inserted. However the top surface 14 provides rigid supports for the majority of a load of a user's arm whereas the pockets 20 having the cushions 26 therein provide a cushioned support for portions of the arm which may protrude such as the elbow or wrist.

For instance, the panel 12 may include three pockets 20 and two beverage container openings 16. The beverage container openings 16 are centered along an axis which generally bisects the length of the panel 12. One pocket 20 is disposed between a first side edge 44 of the panel 12 and the first beverage container opening 16a. A second pocket 20 is disposed between the first and second beverage container openings 16b, and a third pocket 20 is disposed between the second beverage container opening 16b and a second side edge 46 of the panel 12.

Accordingly as the user rests his or her arm on the cup holder 18 the wrist may likely be placed on the cushion 26 disposed between the front side edge and the first beverage container opening 16a and the elbow may be disposed on the cushion 26 found between the second beverage container opening 16b and the second side edge 46. Thus the cup holder assembly 10 provides a surface wherein portions of the surface are cushioned to provide the user with comfort when placing and supporting its arm on the cup holder assembly 10 yet having a rigid top surface 14 which is operable to support the weight of a user's arm.

Obviously many modifications and variations of the present invention are possible in light of the above teachings and may be practiced otherwise than as specifically described while within the scope of the appended claims.

The invention claimed is:

1. A cup holder assembly comprising:
a panel having a top surface, the top surface extending along a generally horizontal plane, the top surface having a first beverage container opening and a second beverage container opening spaced apart the first beverage container opening, the first and second beverage container openings are centered on the panel and aligned along an axis extending the length of the panel;
a cup holder having an opening aligned with the first beverage container opening;
at least one pocket formed on the top surface of the panel, the pocket having an opening coplanar with the opening of the cup holder, one of the at least one pocket is disposed between a first side edge of the panel and the first beverage container opening, and the another one of the at least one pocket is disposed between a second side edge of the panel and the second beverage container opening;
a skin disposed on the top surface of the panel and
a cushion disposed within the pocket, the cushion having an upper surface, the upper surface is generally coplanar with the top surface.

2. The cup holder assembly as set forth in claim 1, wherein the cushion is formed from a closed pore foam.

3. The cup holder assembly as set forth in claim 1, wherein the cup holder includes a side wall and a pair of containers, each of the pair of containers adapted to hold a beverage container, each of the pair of containers disposed on respective ends of the side wall and opposite each other, one of the pair of containers registered to fit beneath the first beverage container opening and the other of the pair of containers registered to fit beneath the second beverage container opening.

4. The cup holder assembly as set forth in claim 3, wherein each of the pair of containers include a container opening, and a lip extending radially and outwardly from the container opening, the lip mounted to an underside of the panel.

5. The cup holder assembly as set forth in claim 1, further including a peripheral wall extending downwardly from an outer edge of the panel, the skin mounted over the peripheral wall.

6. The cup holder assembly as set forth in claim 5, wherein the skin is formed from a synthetic material.

7. The cup holder assembly as set forth in claim 1, wherein one of the at least one pocket is disposed between the first beverage container opening and the second beverage container opening.

* * * * *